United States Patent
Norrie et al.

Patent Number: 5,517,514
Date of Patent: May 14, 1996

[54] PARITY CHECKING SYSTEM WITH REDUCED USAGE OF I/O PINS

[75] Inventors: Chris Norrie; Luis Ancajas, both of San Jose; Carolee Newcomb, Los Altos; Allan Zmyslowski, Sunnyvale, all of Calif.

[73] Assignee: Amdahl Corporation, Sunnyvale, Calif.

[21] Appl. No.: 271,936

[22] Filed: Jul. 7, 1994

Related U.S. Application Data

[63] Continuation of Ser. No. 975,432, Nov. 12, 1992, abandoned.

[51] Int. Cl.[6] ................................................. G06F 11/00
[52] U.S. Cl. ............................................................. 371/49.1
[58] Field of Search ................................ 371/49.1, 49.2, 371/50.1, 51.1; 364/737, 738, 68.2, 67.1

[56] References Cited

U.S. PATENT DOCUMENTS

| | | | |
|---|---|---|---|
| 4,295,219 | 10/1981 | Draper et al. | 371/51 |
| 4,450,562 | 5/1984 | Wlacyk et al. | 371/51 |
| 4,462,102 | 7/1984 | Povlick | 371/49 |
| 4,472,805 | 9/1984 | Wlacyk et al. | 371/51 |
| 4,538,271 | 8/1985 | Kohs | 371/49 |
| 4,710,935 | 12/1987 | Kim et al. | 371/49 |
| 4,823,347 | 4/1989 | Chin et al. | 371/49 |
| 4,876,686 | 10/1989 | Sasaki et al. | 371/49.1 |
| 4,962,501 | 10/1990 | Byers et al. | 371/51.1 |
| 5,033,050 | 7/1991 | Murai | 371/49.1 |

*Primary Examiner*—Robert W. Beausoliel, Jr.
*Assistant Examiner*—T. Tu
*Attorney, Agent, or Firm*—Fliesler, Dubb, Meyer & Lovejoy

[57] ABSTRACT

A data integrity system comprising a plurality of units connected together for the transfer of data between the units. Each said unit comprises data means for receiving data from one or more other units and/or transmitting data to one or more other units, first means, if the unit transmits data to other units, for generating a PARITY OUT signal indicating the parity of all data transmitted to the other units and second means, if the unit is to receive data from other units, for generating a PARITY IN signal indicating the parity of all data being received by the unit from the other units. A third means, located in one of said plurality of units, receives all the PARITY OUT signals and all the PARITY IN signals generated by the plurality of units and detects from all the received PARITY IN signals and all the PARITY OUT signals whether an error had occurred during the transfer of data between the units.

11 Claims, 2 Drawing Sheets

PARITY CHECKING SYSTEM WITH REDUCED USAGE OF I/O PINS

This application is a continuation of application Ser. No. 07/975,432, filed Nov. 12, 1992, now abandoned.

BACKGROUND

1. Field of the Invention

This invention relates to a system for checking parity between data transferred between integrated circuit chips while reducing the usage of I/O pins on each of the integrated circuit chips.

2. Description of the Related Art

In computer systems it is desirable to maintain the integrity of data as data is transferred between integrated circuit chips making up the computer system. A common method employed for maintaining data integrity is to provide a parity bit with each group of data bits that are transferred between the integrated circuit chips. Once the data has been received by the receiving integrated circuit chip, parity is checked to ascertain whether an error had occurred during the data transmission.

One limiting factor associated with integrated circuit chips is the number of I/O pins that are available on the chip. A system may require fields of data of different lengths generated on one integrated circuit chip to be transmitted to one or more integrated circuit chips. To maintain data integrity for such transfers, a parity bit is generated for each group of data bits to be transmitted to another given integrated circuit chip and an I/O pin is used to communicate the parity bit. Further, an integrated circuit chip may receive data from more than one integrated circuit chip thereby requiring the use of an I/O pin for each parity bit to be received. Thus, an integrated circuit chip must utilize a number of I/O pins equal to the number of integrated circuit chips to which data is to be sent plus the number of integrated circuit chips from which data is to be received. A conflict arises between the desire to maintain data integrity by providing a parity bit when transferring data between integrated circuit chips and the availability of I/O pins on the integrated circuit chip for receiving and transmitting parity bits to and from other integrated circuit chips.

SUMMARY OF THE INVENTION

It is an object of the present invention to provide a parity checking system which will maintain data integrity for each group of data transmitted to and from each of the integrated circuit chips while minimizing the number of pins necessary on each of the integrated circuit chips.

It is another object of the invention to provide a means for isolating an error when such an error occurs within the system such that corrective action might be invoked.

Briefly, the invention requires that each integrated circuit chip generate a parity out bit for all data being transmitted from that integrated circuit chip and a parity in signal for all data received by that integrated circuit chip. An error chip is provided that receives the parity in signal and the parity out signal from all of the integrated circuit chips within the system. The error chip then generates a total parity in signal and a total parity out signal from the received parity in signals and parity out signals. The total parity in signal is compared to the total parity out signal and if they are not equal an error signal is generated. When an error in transmission has occurred, means are provided for freezing the system such that error analysis can be undertaken and the error corrected if possible. Means are provided in each integrated circuit chip for generating a parity bit for each block of data bits that are to be sent to another integrated circuit chip or received from another integrated circuit chip. The parity bit for each block of data bits so transferred or received is preserved in a latch when an error signal is generated by the error chip. The latch parity bits are then used in error analysis to isolate the error to a specific chip and to a specific block of data being transferred by that integrated circuit chip.

An advantage of the present invention is that data integrity is maintained while minimizing the number of I/O pins to a data parity out signal pin, a data parity in signal pin and to a freeze signal pin.

Another advantage of the present invention is that parity bit is not transmitted for each block of data bits transmitted to and from the various integrated circuit chips within the system thereby reducing the number of I/O pins used for data integrity.

BRIEF DESCRIPTION OF THE DRAWINGS

The invention will be described with respect to the particular embodiments thereof and reference will be made to the drawings, in which.

DETAILED DESCRIPTION OF THE PREFERRED EMBODIMENTS

Figure 1:
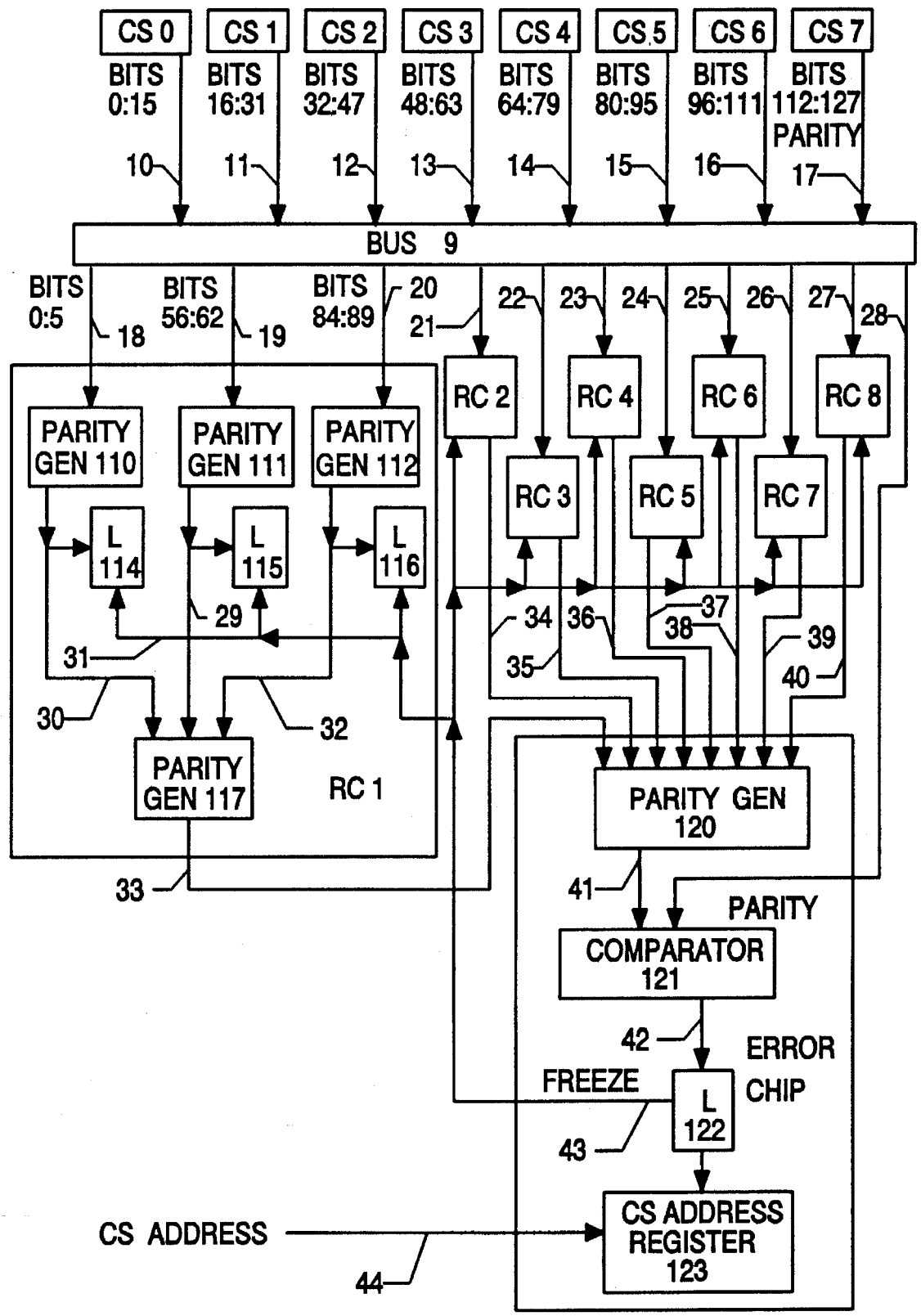
FIG. 1 is a logic diagram illustrating the invention used for data transfer between control store chips and receiving chips.

FIG. 1 illustrates the invention for maintaining data integrity between a computer storage and a plurality of receiving chips.

The computer storage is comprised of eight computer storage chips CS0 through CS7. Each computer storage chip stores two bytes of data, i.e. 16 bits of data per data word. A data word contains 128 bits and a parity bit. Eight receiving chips RC1 through RC8 receive portions of the data word transmitted from the computer storage via bus 9. A given receiving chip may receive portions of the data word from the various control store chips CS0 through CS7. The data from the control store chips CS0 through CS7 is provided by means of lines 10 through 17 to bus 9 which then distributes the data via lines 18 through 27 to receiving chips RC1 through RC8, and the parity bit on line 28 to the error chip. It should be noted that a given receiving chip may receive a plurality of groups of data bits from the data word. It is not meant to imply that receiving chips RC2 through RC8 receive one data field per input line, but rather to indicate that data is received from bus 9 by the receiving chips.

Receiving chip RC1 is shown in detail and receiving chips RC2 though RC8 include the same logic to perform the same function as shown and described for receiving chip RC1. Receiving chip RC1 receives bits 0 through 5 on line 18 from control store CS0, bits 56 through 62 on line 19 from control store CS4, and bits 84 through 89 on line 20 from control store CS5. Parity generator 110 will generate a parity bit on line 30 for bits 0 through 5. Parity generator 111 will generate a parity bit on line 29 for bits 56 through 62. Parity generator 112 will generate a parity bit on line 32 for bits 84 through 89. The output of parity generator 10 is monitored by latch 114, the output of parity generator 111 is monitored by latch 115 and the output of parity generator 112 is monitored by latch 116. Parity generator 117 generates a parity bit from the parity bits on lines 29, 30 and 32. The output of parity generator 117 is a parity bit which is the parity in signal for chip RC1, and is connected to parity generator 120 on the error chip.

In similar fashion, each of the other receiving chips RC2 through RC8 have similar logic for each group of bits received by that receiving chip from each of the control store chips. Receiving chips RC2 through RC8 provide their parity in signals on lines 34 through 40, respectively, which are in turn connected to parity generator 120. Parity generator 120 will generate a parity bit, which is the total parity in signal, from the parity in signals provided on lines 33 through 40 from receiving chips RC1 through RC8. Comparator 121 compares the total parity in signal from parity generator 120 with the parity bit on line 28, which is effectively the total parity out signal for control store chips CS0 through CS7 associated with the data word. If the two parity bits or signals do not compare then an error was encountered in the transmission of the data from the storage to the various receiving chips. Such a condition will cause a signal on line 42 to set latch 122. When latch 122 is set, a freeze signal on line 43 is generated which inhibits altering the contents of the latches within each of the receiving chips RC1 through RC8 the output of the various parity generators associated with each of those chips thereby maintaining the parity bit for the purposes of error analysis. The control store address of the data being transmitted on bus 9 is also provided by line 44 to control store address register 123 on the error chip. Latch 122, when set by an error condition, will freeze the contents of the control store address register such that the address of the data being read out of the control store giving rise to the error condition is maintained.

It can readily be seen that data integrity is maintained by the use of only one I/O pin for each receiving chip for transmitting a parity out signal for that chip. A second I/O pin is used to receive the freeze signal for maintaining the parity bit for each block of data from each control store chip received by each receiving chip thereby allowing error analysis to be performed. Each bit of the data word is received by one of the receiving chips.

In some systems the control store address and the status of the various latches will be stored for error analysis and the failing instruction will be retried. Such information can be stored over a period of time to determine if the error is an isolated soft error or a fixed hard error.

Figure 2:
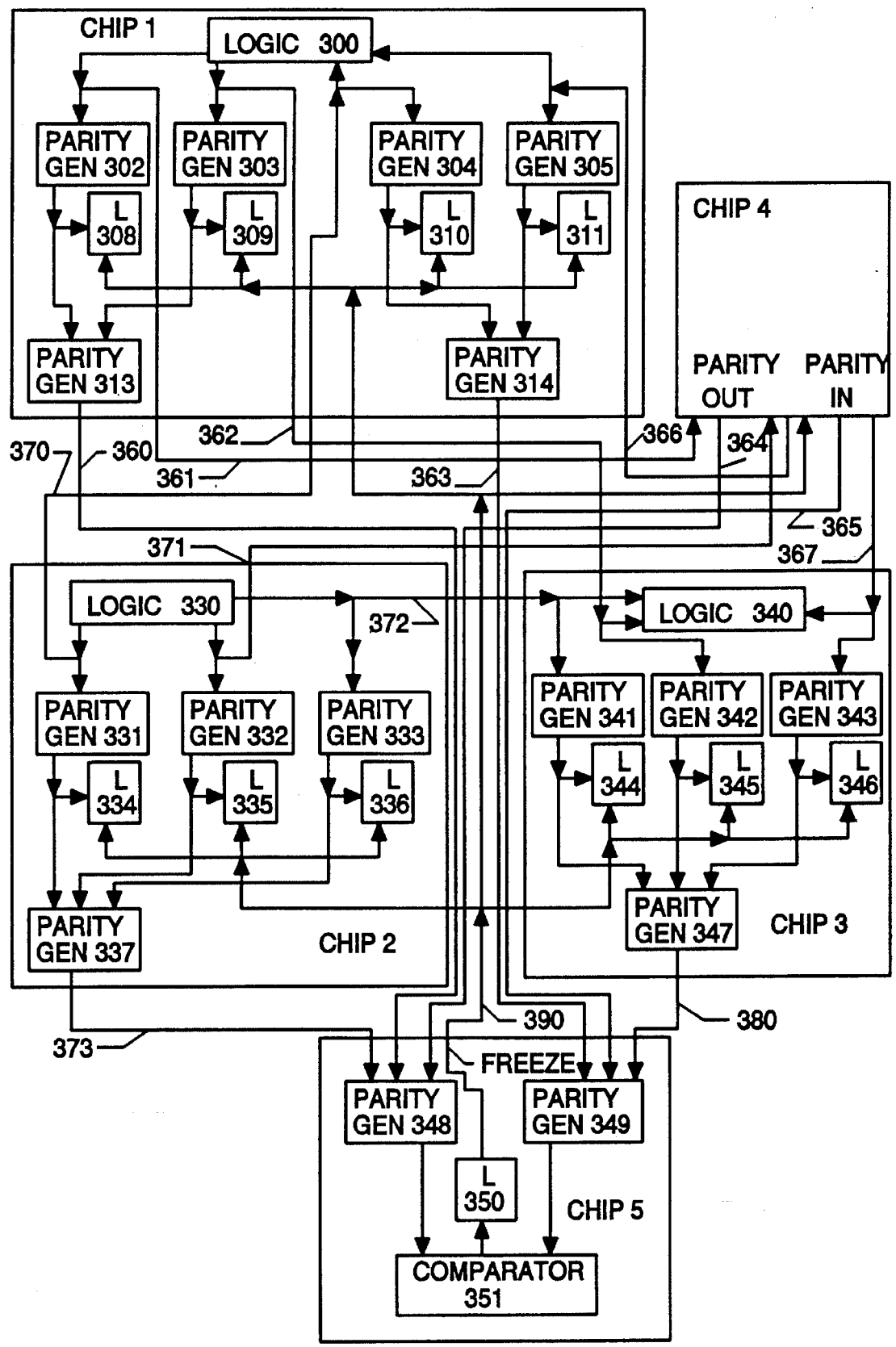
FIG. 2 is a logic diagram illustrating the invention for data transfer between various logic chips within the computing system.

FIG. 2 illustrates the invention used for communicating data groups among various integrated circuit chips. In this embodiment, by way of example, the integrated circuit chips are CHIPs 1, 2, 3 and 4, and an error chip is provided as CHIP 5.

CHIP 1 receives a data group from CHIP 2 on line 370 and from CHIP 4 on line 366 and transmits a data group to CHIP 3 on line 362 and to CHIP 4 on line 361. CHIP 2 transmits a data group to CHIP 1 on line 370, to CHIP 3 on line 372 and to CHIP 4 on line 371. CHIP 2 does not receive any data from any other CHIP. CHIP 3 receives only data groups from the other CHIPs. CHIP 3 receives a data group from CHIP 1 on line 362, from CHIP 2 on line 372 and from CHIP 4 on line 367. CHIP 4 receives a data group from CHIP 1 on line 361 and from CHIP 2 on line 371 and transmits a data group to CHIP 1 on line 366 and to CHIP 3 on line 367.

On CHIP 1, parity generator 304 generates a parity bit for the data group received from CHIP 2 on line 370, parity generator 305 generates a parity bit for the data group received on line 366 from CHIP 4, parity generator 303 generates a parity bit for the data group to be transmitted on line 362 to CHIP 3 and parity generator 302 generates a parity bit for the data group to be transmitted on line 361 to CHIP 4. Parity generator 313 will generate a parity bit from the parity bits generated by parity generators 302 and 303 and will transmit the generated parity bit on line 360 as the parity out signal for CHIP 1. Parity generator 314 will generate a parity bit from the parity bits generated by parity generators 304 and 305 and will transmit the generated parity bit on line 363 as the parity in signal for CHIP 1. Latches 308, 309, 310 and 311 will store the parity bits from parity generators 302, 303, 304 and 305 respectively when a freeze signal is received on line 390 by the latches.

Chip 4 has the same configuration of latches and parity generators as in CHIP 1 and, therefore, the logic is not shown. CHIP 4 generates a parity out signal on line 364 from the parity bits generated from the data groups transmitted from CHIP 4 to CHIPs 1 and 3. CHIP 4 generates a parity in signal on line 365 from the parity bits generated from the data groups received by CHIP 4 from CHIPs 1 and 2.

On CHIP 2, parity generator 331 generates a parity bit for the data group to be transmitted on line 370 to CHIP 1, parity generator 332 generates a parity bit for the data group to be transmitted on line 371 to CHIP 4 and parity generator 333 generates a parity bit for the data group to be transmitted on line 372 to CHIP 3. Parity generator 337 generates a parity bit from the parity bits generated by parity generators 331, 332 and 333 and provides on line 373 that generated parity bit as the parity out signal for CHIP 2. Latches 334, 335 and 336 will store the parity bits generated by parity generators 331, 332 and 333 respectively when latches 334, 335 and 336 receive a freeze signal on line 390. CHIP 2 does not generate a parity in signal since CHIP 2 did not receive any data groups from any other chip participating in the data checking system.

On CHIP 3, parity generator 341 generates a parity bit for the data group received on line 372 from CHIP 2, parity generator 342 generates a parity bit for the data group received on line 362 from CHIP 1 and parity generator 343 generates a parity bit for the data group received on line 367 from CHIP 4. Parity generator 347 generates a parity bit from the parity bits generated by parity generators 341, 342 and 343 and provides on line 380 that generated parity bit as the parity in signal for CHIP 3. Latches 344, 345 and 346 will store the parity bits generated by parity generators 341, 342 and 343 respectively when latches 344, 345 and 346 receive a freeze signal on line 390. CHIP 3 does not generate a parity out signal since CHIP 3 does not transmit any data groups to any other chip participating in the data checking system.

On the error chip, CHIP 5, parity generator 348 generates a total parity out signal from the parity out signals of CHIP 1 on line 360, CHIP 2 on line 373 and CHIP 4 on line 364. The generate total parity out signal is a parity bit for all the data bits in all the data groups transmitted by all of the chips participating in the data checking system. Parity generator 349 generates a total parity in signal from the parity in signals of CHIP 1 on line 363, CHIP 3 on line 380 and CHIP 4 on line 365. The generate total parity in signal is a parity bit for all the data bits in all the data groups received by all of the chips participating in the data checking system. Comparator 351 is connected to parity generators 348 and 349 and compares the total parity in signal with the total parity out signal. If no transmission error occurred then the total parity in signal will equal the total parity out signal. Where an error does occur then the total parity in signal will not match the total parity out signal and comparator 351 will set latch 350. Latch 350 will generate a freeze signal on line 390 to CHIPs 1, 2, 3 and 4 thereby causing latches in each of those chips to store and hold the value of the parity bit generated by that latch's associated parity generator.

It is readily discernable that a parity bit is generated for each data group transmitted or received and the availability of the value of those parity bits when an error does occur allows the system to isolate the failure to a specific data group transferred from a specific chip to a specific receiving chip. An error log can be used to determine from the error history of the system whether or not an error is soft or hard whereupon appropriate corrective action may be taken.

This embodiment illustrates the three types of chips that might be involved within the system, that is a chip such as CHIPs 1 and 4 which both receive and transmit data groups or a chip such as CHIP 2 which only transmits data groups or a chip such as CHIP 3 which only receives data groups. On chips such as CHIPs 1 and 4, a parity out signal and a parity in signal is generated which utilizes only two I/O pins regardless of the number of data groups received or transmitted by the chip. On chips such as CHIP 2 only a parity out signal is generated which utilizes only one I/O pin regardless of the number of data groups transmitted by the chip. On chips such as CHIP 3 only a parity in signal is generated which utilizes only one I/O pin regardless of the number of data groups received by the chip. Each of the chips receive the freeze signal on line 390 thereby utilizing one I/O pin for setting the various latches within each of the chips to maintain the value of all the parity bits in the system for error isolation. Therefore, it is readily apparent from the foregoing that data integrity is maintained throughout the system while minimizing the number of I/O pins on each chip for providing the information necessary to detect and isolate errors.

CHIP 5 is the error chip and while it is shown to have received only inputs from four chips, it should be understood that any number of chips can be involved within the system where each chip will generate a parity out and/or a parity in parity signal in a manner as described heretofore. The error chip will generate a total parity in signal from all parity in signals from all participating chips and a total parity out signal from all parity out signals generated by all participating chips for testing whether a transmission error has occurred.

While the invention has been particularly shown and described with reference to the preferred embodiments thereof, it will be understood by those skilled in the art that changes in form and detail may be made therein without departing from the spirit and scope of the invention. Given the disclosure of general concepts and specific embodiments, the scope of the protection sought is defined by the following claims.

What is claimed is:

1. A data integrity system comprising:

a plurality of units connected together where data is transferred during a transfer period between at least three units of said plurality of units whore a unit may send and receive data to and from one or more units of said plurality of units dung a transfer period and each unit of said plurality of units has a plurality of input/output lines where only one line of said input/output lines is used as a first output line for a PARITY OUT signal indicating the parity of all data transmitted during a transfer period from said unit to all other units and for communicating said PARITY OUT signal to a parity checking means and where only one line of said input/output lines is used as a second output line for a PARITY IN signal indicating the parity of all data received during a transfer period by said unit from all other units and for communicating said PARITY IN signal to a parity checking means and where the use of only said first and second output lines by each of said units reduces the number of input/output lines used in communicating the parity of said data being transmitted or received by said unit;

a data unit within each said unit of said plurality of units, each said data unit comprising:

data means during a transfer period either receiving data from one or more of said other data units or transmitting data to one or more of said other data units or receiving data from one or more of said other data units and transmitting data to one or more of said other data units;

first means, if said data unit is to transmit data to said other data units, for generating on said first output line said PARITY OUT signal indicating parity of all data transmitted during a transfer period by said data unit to said other data units; and second means, if said data unit is to receive data from said other data units, for generating on said second output line said PARITY IN signal indicating parity of all data received during a transfer period by said data unit from said other data units; and said parity checking means, located in one of s aid plurality of units, for receiving all said PARITY OUT signals and all said PARITY IN signals generated by said plurality of data units during a transfer period and for detecting from all said received PARITY IN signals and all said PARITY OUT signals whether an error had occurred during the transfer of data between said plurality of units during a transfer period.

2. The data integrity system of claim 1 wherein said first means comprises:

one or more first parity generators, each said first parity generator generating a FIRST PARITY signal indicating the parity of the data being transmitted to one of said other data units; and a second parity generator for receiving all said FIRST PARITY signals from all said first parity generators and for generating from all said received FIRST PARITY signals said PARITY OUT signal for said data unit thereby indicating the parity of all data being transmitted by said data unit to all said other data units.

3. The data integrity system of claim 2 wherein said first means further comprises:

a plurality of latches, each latch connected to one of said first parity generators for storing the value of said FIRST PARITY signal generated by said first parity generator.

4. The data integrity system of claim 1 wherein said second means comprises:

one or more first parity generators, each said first parity generator generating a FIRST PARITY signal indicating the parity of the data being received from one of said other data units; and a second parity generator for receiving all said FIRST PARITY signals from all said first parity generators and for generating from all said received FIRST PARITY signals said PARITY IN signal for said data unit thereby indicating the parity of all data being received by said data unit from all said other data units.

5. The data integrity system of claim 3 wherein said second means further comprises:

a plurality of latches, each said latch connected to one of said first parity generators for storing the value of said FIRST PARITY signal generated by said first parity generator.

6. The data integrity system of claim 1 wherein said parity checking means further comprises:

a first parity generating, from all said received PARITY OUT signals, a TOTAL PARITY OUT signal indicating the parity for all the data being transmitted by all said data units;

a second parity generator, for generating from all said received PARITY IN signals, a TOTAL PARITY OUT signal indicating the parity for all the data being transmitted by all said data units;

a second parity generator, for generating from all said received PARITY IN signals, a TOTAL PARITY IN signal indicating the parity for all the data being received by all said data units; and a comparator for generating an ERROR signal when said TOTAL PARITY IN signal is not equal to said TOTAL PARITY OUT signal.

7. The data integrity system of claim 1 wherein: said first means further comprises:

one or more first parity generators, each said first parity generator generating a FIRST PARITY signal indicating the parity of the data being transmitted to one of said other data units;

a second parity generator for receiving all said FIRST PARITY signals from all said first parity generators and for generating from all said received FIRST PARITY signals said PARITY OUT signal for said data unit thereby indicating the parity of all dam being transmitted by said data unit to all said other data units; and a plurality of latches, each latch connected to one of said first parity generators for storing the value of said FIRST PARITY signal generated by said first parity generator;

said second means further comprises:

one or more first parity generators, each said first parity generator generating a FIRST PARITY signal indicating the parity of the data being received from one of said other data units; and a second parity generator for receiving all said FIRST PARITY signals from all said first parity generators and for generating from all said received FIRST PARITY signals said PARITY IN signal for said data unit thereby indicating the parity of all data being received by said data unit from all said other data units; and a plurality of latches, each latch connected to one of said first parity generators for storing said parity indicated by said FIRST PARITY signal generated by said first parity generator;

said parity checking means further comprises:

a first parity generator for generating, from all said received PARITY OUT signals, a TOTAL PARITY OUT signal indicating the parity for all the data being transmitted by all said data units;

a second parity generator, for generating from all said received PARITY IN signals, a TOTAL PARITY IN signal indicating the parity for all the data being received by all said data units; and a comparator for generating an ERROR signal when said TOTAL PARITY IN signal is not equal to said TOTAL PARITY OUT signal, said Error signal connected to each of said latches in said first and second means in each said data unit for storing in said latches said parity of said FIRST PARITY signal generated by said first parity generators connected to each said latch.

8. The data integrity system of claim 7 further comprising:

each of said data units being either a memory unit or a non memory unit, each of said memory units transmitting data to one or more of said non memory units, said data being in the form of a data word in said memory unit, each said data word including a parity bit indicating the parity of the data in said data word;

register means for storing a memory unit address for said memory unit for each of said data word being transmitted, in whole or in part, to one or more of said data units; and said parity checking means receiving said parity bit of said data word being transmitted and treating said received parity bit as a said PARITY OUT signal for said memory unit.

9. The data integrity system of claim 8 wherein said parity checking means and said register means are located in an error unit of said plurality of units.

10. The data integrity system of claim 8 wherein each said data unit having a first, second or parity checking means is an integrated circuit chip having a plurality of pins where only one pin is used for the PARITY OUT signal and one pin is used for the PARITY IN signal for reducing the number of pins used in communicating the parity of said data being transmitted or received by said integrated circuit chip.

11. The data integrity system of claim 9 wherein each said data unit having a first, second or parity checking means is an integrated circuit chip having a plurality of pins where only one pin is used for the PARITY OUT signal and one pin is used for the PARITY IN signal for reducing the number of pins used in communicating the parity of said data being transmitted or received by said integrated circuit chip.

* * * * *

UNITED STATES PATENT AND TRADEMARK OFFICE
CERTIFICATE OF CORRECTION

PATENT NO. : 5,517,514
DATED : May 14, 1996
INVENTOR(S) : Chris Norrie et al.

It is certified that error appears in the above-indentified patent and that said Letters Patent is hereby corrected as shown below:

Column 5, line 62, "whore" should be --where--.
Column 5, line 64, "dung" should be --during--.
Column 7, line 4, "claim 3" should be --claim 4--.
Column 7, line 12, after "a first parity" insert --generator for--.
Column 7, lines 16-20, delete the duplicated paragraph.
Column 7, line 28, after "wherein:" insert a paragraph.
Column 7, line 38, "dam" should be --data--.

Signed and Sealed this

Twenty-fifth Day of November, 1997

Attest:

BRUCE LEHMAN

Attesting Officer

Commissioner of Patents and Trademarks